Figure 1:
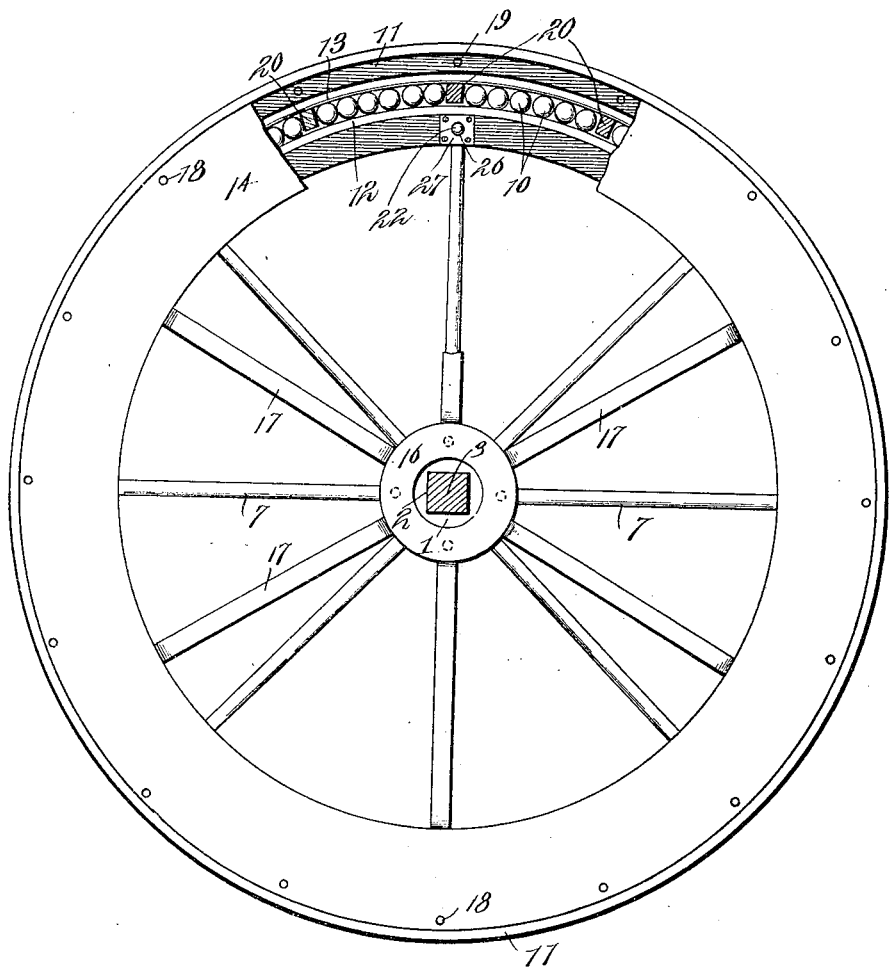

No. 666,338. Patented Jan. 22, 1901.
F. P. VAUGHAN.
WHEEL.
(Application filed June 25, 1900.)
(No Model.) 2 Sheets—Sheet 1.

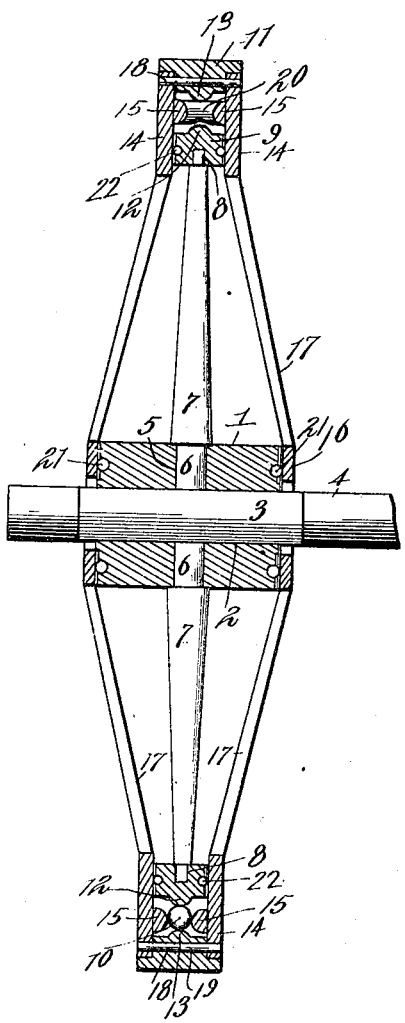
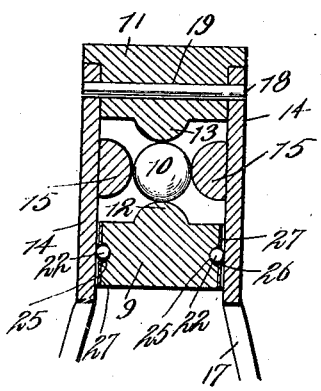
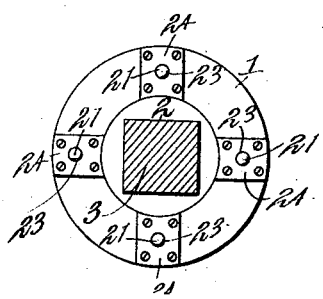

UNITED STATES PATENT OFFICE.

FREDERICK P. VAUGHAN, OF PERRY, OKLAHOMA TERRITORY.

WHEEL.

SPECIFICATION forming part of Letters Patent No. 666,338, dated January 22, 1901.

Application filed June 25, 1900. Serial No. 21,501. (No model.)

*To all whom it may concern:*

Be it known that I, FREDERICK P. VAUGHAN, a citizen of the United States, residing at Perry, in the county of Noble, Oklahoma Territory, have invented a new and useful Wheel, of which the following is a specification.

The invention relates to improvements in wheels.

The object of the present invention is to improve the construction of ball-bearing wheels and to provide a simple and comparatively inexpensive one designed for use on all kinds of vehicles, conveyances, machines, and the like and capable of reducing the friction resulting from supporting a great weight to a minimum.

The invention consists in the construction and novel combination and arrangement of parts hereinafter fully described, illustrated in the accompanying drawings, and pointed out in the claims hereto appended.

In the drawings, Figure 1 is an elevation, partly in section, of a wheel constructed in accordance with this invention. Fig. 2 is a vertical sectional view of the same. Fig. 3 is an enlarged detail view illustrating the construction of the rim or outer portion of the wheel. Fig. 4 is a detail view of the hub-section of the wheel.

Like numerals of reference designate corresponding parts in all the figures of the drawings.

1 designates a hub-section provided with a central rectangular opening 2, adapted to receive the squared portion 3 of an axle 4, whereby the wheel is rigidly connected with the said axle; but any other suitable means may be employed for fixing the hub-section to the axle. The hub-section is provided with a series of spoke-sockets 5 for the reception of the inner end 6 of spokes 7, which are provided at their outer ends with tenons 8, fitting in mortises of an inner bearing-ring 9, as clearly illustrated in Fig. 2 of the accompanying drawings; but the spokes may be formed integral with the hub-section and the inner bearing-ring or may be constructed in any desired manner to provide a traction or carrying wheel of any character.

The improvements are designed to be applied to the carrying-wheels of all kinds of vehicles, conveyances, and machines, and in order to reduce to a minimum the friction resulting from the weight to be supported an annular series of antifriction-balls 10 are interposed between the inner bearing-ring and an outer bearing ring or rim 11, the outer face of which forms the tread of the wheel.

The inner bearing-ring is provided at the center of its outer peripheral face with an approximately semicircular bearing-rib 12, extending entirely around the bearing-ring and presenting a rounded or convex bearing-face and located equidistant of the side faces of the inner bearing-ring, as clearly illustrated in Fig. 3 of the accompanying drawings. The bearing-rib 12 may be formed integral with the inner bearing-ring, or it may be constructed separate therefrom, and the outer bearing ring or rim is provided at its inner face with a similar-shaped rib 13, located equidistant of the side faces of the ring or rim and presenting a convex or rounded bearing-surface to the balls 10. The bearing ring or rim 11 is supported by sides 14, located at opposite sides of the wheel and provided at their inner faces with rounded bearing-ribs 15, approximately semicircular in cross-section and arranged at opposite sides of the series of balls, as shown in Fig. 3. By providing the rounded bearing-ribs at the four sides of the balls, as illustrated in Fig. 3, the contact of the balls with the inner and outer portions of the wheel is reduced to a minimum and is substantially only a point.

The sides of the wheel may consist of disks; but in order to lighten the construction they may be composed of outer side plates or rings, inner annular plates or rings 16, and connecting portions or spokes 17, as clearly shown in Figs. 1 and 2. The outer annular plates are secured by transverse fastening devices 18 in recesses 19 of the outer ring or rim, and they close the outer bearing and are adapted to exclude dust therefrom. A continuous annular series of main balls 10 may be provided at the outer bearing, or the balls may be separated into sets of one or more by partitions 20, extending across the space between the side plates, as clearly shown in Figs. 1 and 2. By recessing the side faces of the outer bearing rim or ring a broad tread is provided and the side plates are prevented from coming in contact with the supporting-surface or tread.

In order to reduce the friction further, antifriction-balls 21 and 22 are arranged at the center and rim or outer portion of the wheel, at the side faces of the inner bearing-ring, and at the ends of the hub, and they are interposed between the inner or body portion of the wheel and the outer portion, which is adapted to move independently of the inner portion. The inner portion, which is fixed to the axle, is composed of the hub, the inner bearing-ring, and the connecting-spokes, while the outer portion comprises the sides and the rim or outer bearing-ring. The inner balls 21 are mounted in suitable recesses and project through apertures 23 of plates 24, which are secured to the ends of the hub, as clearly shown in Figs. 2 and 4, and any number of these antifriction-balls may be employed. The outer antifriction-balls 22, which are mounted in a similar manner, are arranged in sockets or recesses 25 of the inner bearing-ring and project through apertures 26 of plates 27, secured to the side faces of the inner bearing-ring. The inner and outer supplemental bearing-balls receive the inner and outer annular portions of the sides and enable the same to rotate frictionlessly around the inner fixed supporting portion of the wheel.

It will be seen that the wheel is exceedingly simple and inexpensive in construction, that it is applicable to all kinds of vehicle-wheels and carrying-wheels of other conveyances and machines, and that by providing bearings contacting only at four points with the main supporting-balls the friction is reduced to a minimum. It will also be apparent that the sides, which are connected with the rim or outer bearing-ring, close the sides of the bearings and may consist of continuous disks or of open-work to lighten the construction.

What I claim is—

1. A wheel comprising an inner portion provided with an inner bearing-ring having an exterior bearing-rib located at the center of its outer periphery and presenting a convex bearing-face, an outer bearing-ring provided at its inner face with a corresponding rounded bearing-rib, located opposite the said bearing-rib, sides provided at their inner faces with bearing-ribs having convex bearing-faces, and balls interposed between the inner and outer bearing-rings and contacting with the said bearing-ribs, whereby the friction is reduced to a minimum, substantially as described.

2. A wheel comprising an inner portion provided with an inner bearing-ring having a bearing-rib presenting a rounded or convex bearing-face, an outer bearing ring or rim having a bearing-rib at its inner face, presenting a rounded bearing-face, the sides provided at their inner faces with annular bearing-ribs, an annular series of bearing-balls interposed between the ribs, and partitions located at intervals and separating the balls into sets, substantially as described.

3. A wheel comprising a hub, an inner bearing-ring, spokes connecting the inner bearing-ring with the hub, an outer bearing-ring, sides connected with the outer bearing-ring and extending therefrom to the hub, the bearing-ribs arranged at the inner faces of the sides and at the opposite faces of the bearing-rings, and balls interposed between and contacting with the bearing-ribs, substantially as described.

4. A wheel comprising a hub having end sockets, a bearing-ring connected with the hub and provided at its opposite faces with sockets, a rim arranged around the bearing-ring and spaced therefrom, sides connected with the rim and extending therefrom to the hub, balls arranged within the space between the sides and interposed between the bearing-ring and the rim, the supplemental balls seated in the said sockets, and the apertured plates secured to the bearing-ring and the hub and retaining the balls in the sockets, substantially as described.

5. A wheel comprising a hub, an inner bearing-ring, an outer bearing-ring, balls interposed between the bearing-rings, means for connecting the inner bearing-ring with the hub, and sides connected with the outer bearing-ring and having antifriction devices interposed between them and the hub and the inner bearing-ring, substantially as described.

In testimony that I claim the foregoing as my own I have hereto affixed my signature in the presence of two witnesses.

FREDERICK P. VAUGHAN.

Witnesses:
G. W. CROSBY,
P. R. AMOS.